Dec. 2, 1969

C. W. CLARK 3,482,159

TEST CIRCUIT FOR RESONANT FREQUENCY AND IMPEDANCE
DETERMINATION EMPLOYING OSCILLATOR AND BRIDGE
INDUCTIVELY COUPLED BY INTERCHANGEABLE COILS

Filed Feb. 20, 1967

INVENTOR.
CALMAR W. CLARK
BY
ATTYS.

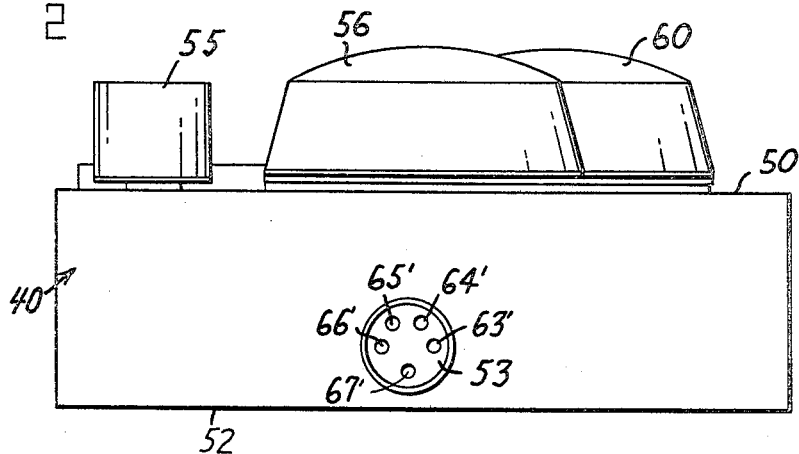
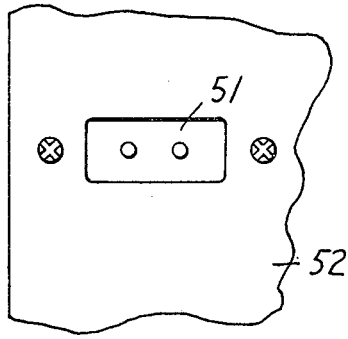
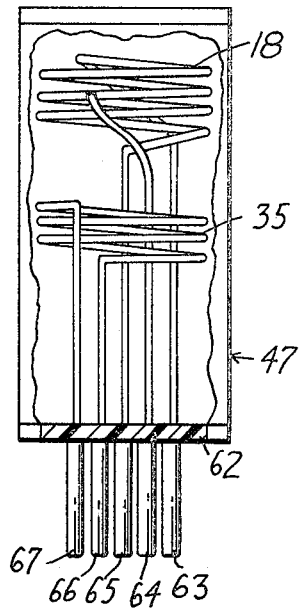
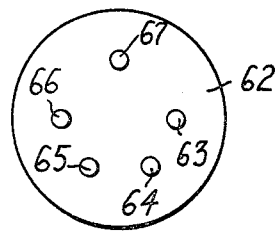

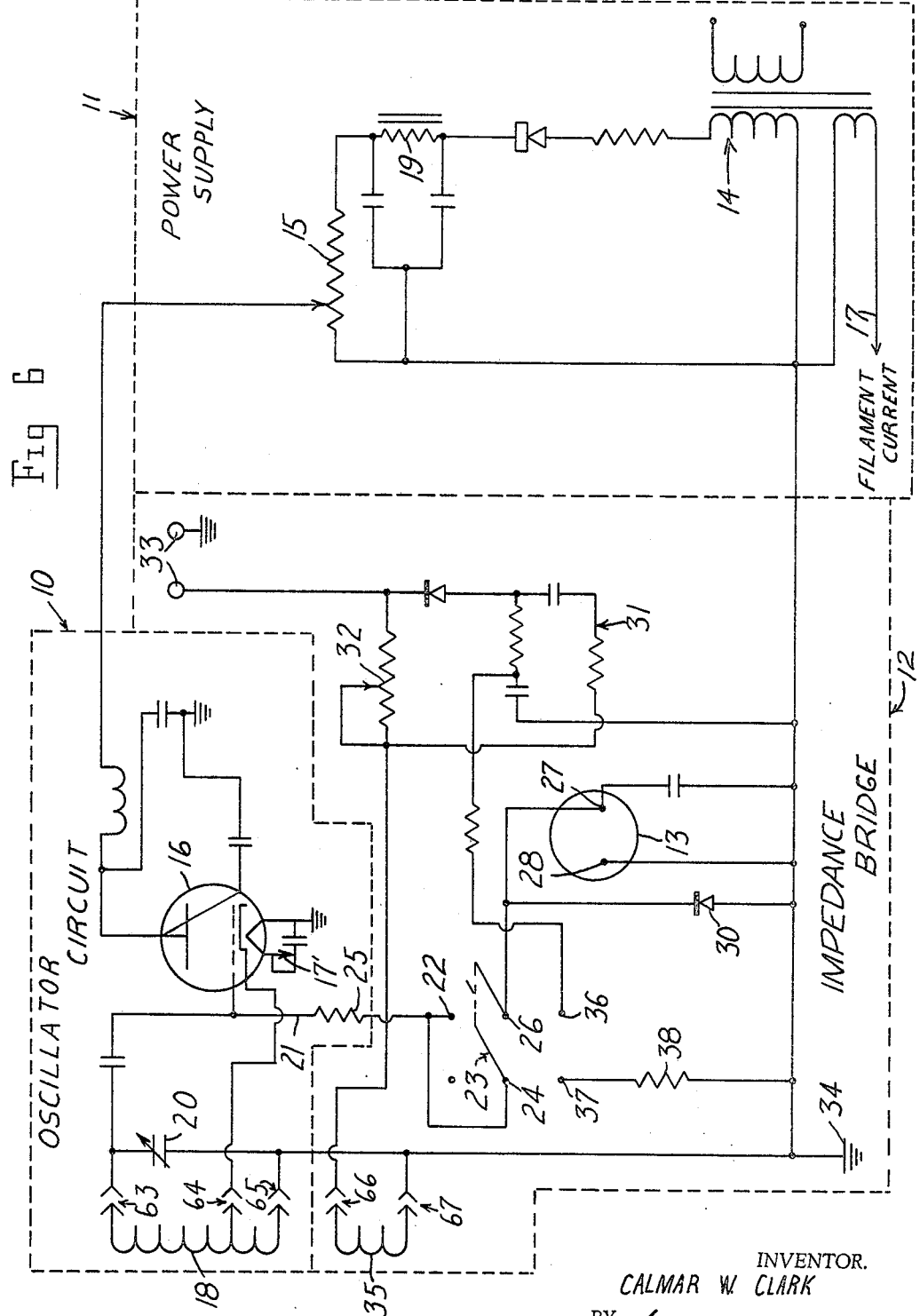

United States Patent Office 3,482,159
Patented Dec. 2, 1969

3,482,159
TEST CIRCUIT FOR RESONANT FREQUENCY AND IMPEDANCE DETERMINATION EMPLOYING OSCILLATOR AND BRIDGE INDUCTIVELY COUPLED BY INTERCHANGEABLE COILS
Calmar W. Clark, Moscow, Idaho, assignor to University of Idaho Research Foundation, Inc., Moscow, Idaho, a corporation of Idaho
Filed Feb. 20, 1967, Ser. No. 617,098
Int. Cl. G01r 27/00, 27/26, 11/52
U.S. Cl. 324—57
6 Claims

ABSTRACT OF THE DISCLOSURE

The electrical apparatus shown herein provides a single test instrument for determination of the resonant frequency of an electrical conductor and the impedance of the conductor at such frequency. The circuit combines circuitry for a grid dip oscillator and an impedance bridge, utilizing a common indicator meter and interchangeable matched coils to provide an inductive coupling between the oscillator and bridge.

BACKGROUND OF THE INVENTION

Figure 1:
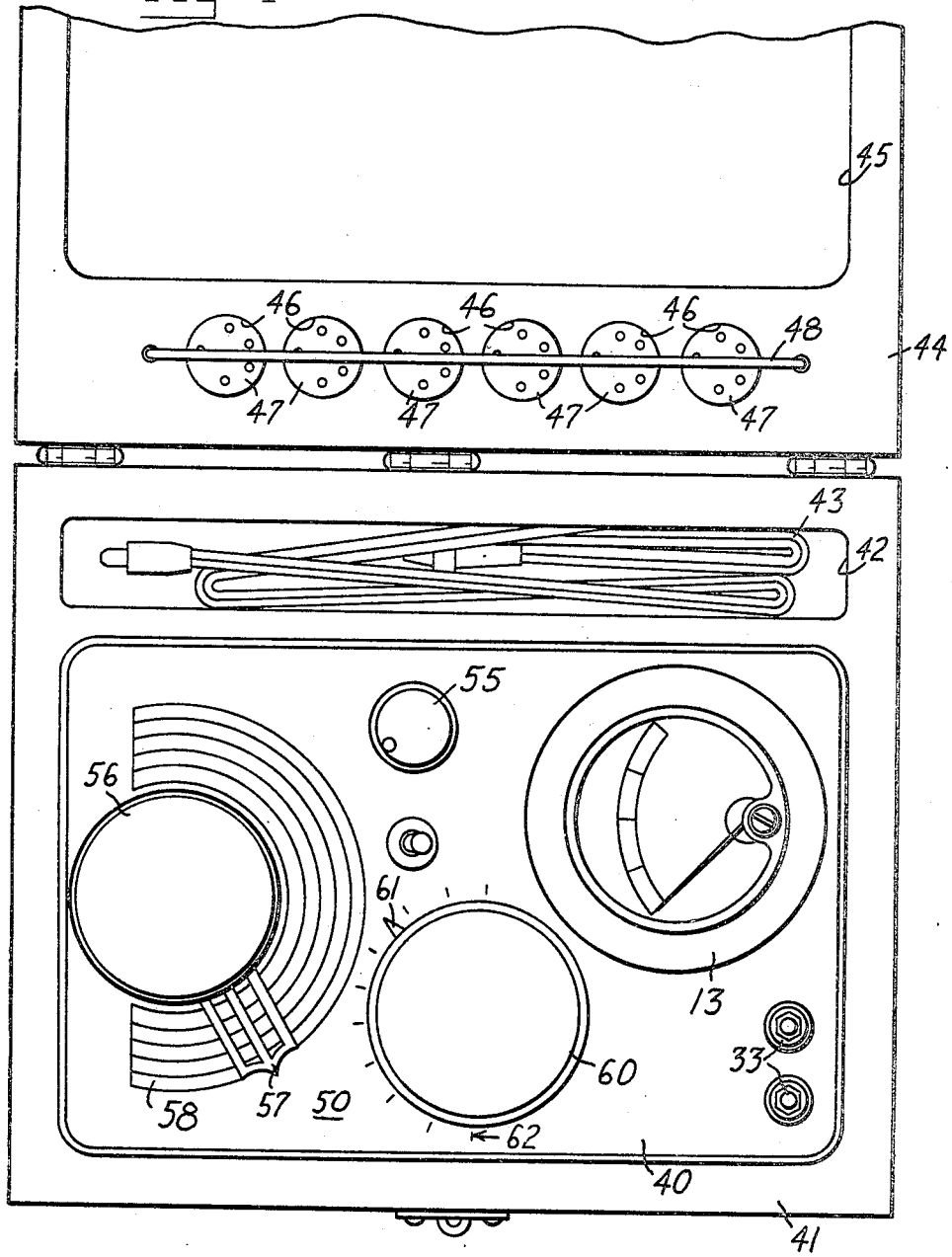

The device disclosed herein provides, in a single instrument, the functions of a plurality of instruments covering a wide range of both frequency and impedance readings. One can simply and economically check the resonant frequency and impedance at that frequency of any conductor, a process now requiring considerable ingenuity and normally entailing the use of many conductors connected between test instruments and the object being tested. Such common test arrangements are not usable outside a laboratory and introduce great possibility of error.

The prior art includes individual circuits for testing frequency and for testing to determine the impedance of a conductor. However, the combining of the circuits in a single integrated instrument has apparently not been anticipated by prior devices. The apparatus disclosed herein also includes the use of interchangeable matched coils to widen the operating range of the instrument.

SUMMARY OF THE INVENTION

The invention described herein is primarily concerned with the unique combination of a grid dip oscillator circuit and a matched impedance bridge, so that one can readily determine both the operating frequency of a conductor and the impedance of the conductor at such frequency. The economy and convenience of such a single instrument are principal attributes of the apparatus.

One object of the invention is to provide a matching of oscillator and impedance bridge circuits so that use of the circuits can be easily integrated without confusion.

Another object of the invention is to provide a simple apparatus for interchanging oscillator and impedance bridge exciting coils so as to have such coils always in proper inductive coupling range and to provide proper matching of the coil characteristics.

Another object of the invention is to provide a dual use test instrument that can be housed in a single casing.

One embodiment of the invention is disclosed in the accompanying drawings. It is to be understood that the specific features shown in the drawings are not intended to limit the scope of the invention.

In the drawings:
FIGURE 1 is a top view of the instrument in a protective case, the case being open with portions of the cover being broken away;
FIGURE 2 is a rear view of the instrument housing removed from the protective casing;
FIGURE 3 is a fragmentary bottom view of the housing showing the connection for the power supply cord;
FIGURE 4 is a plan view of a typical coil unit, the casing of the coil unit being broken away to illustrate the coil elements;
FIGURE 5 is a bottom view of the unit shown in FIGURE 4; and
FIGURE 6 is a circuit diagram for the illustrated test instrument.

DESCRIPTION OF THE PREFERRED EMBODIMENT

The apparatus shown in the drawings constitutes an integrated test instrument for determination of the frequency of an electrical conductor and its impedance at the given frequency. By using calibrated oscillator coils and pick up coils combined in an integral unit, the instrument accurately relates the function of a matched grid dip oscillator circuit and an impedance bridge circuit.

Referring to the circuit diagram shown in FIG. 6, the apparatus comprises a grid dip oscillator circuit generally designated by the numeral 10 and an oscillator power supply generally designed by the numeral 11. Combined in the unit is an impedance bridge generally designated by the numeral 12. A common meter 13 is used in both circuits.

The power supply 11 is designed to provide a filtered alternating current power supply to the grid dip oscillator circuit. It includes a transformer 14 and a filtering resistor 19 preferably constructed of high resistance wire wound about an iron core. By utilizing a powdered iron core wrapped with a few turns of high resistance wire, I have successfully filtered the power supply with a structure that saves considerable space as compared to the choke ordinarily used in such circuits. A variable resistor 15 is used for amplitude control.

The grid dip oscillator circuit 10 includes a vacuum triode tube 16. The filament voltage for tube 16 is provided by a transformer tap at 17 in the power supply 11. The connection to the tap 17 is designated at the tube 16 by the numeral 17'.

The grid dip oscillator circuit includes a center-tapped coil 18. It further includes a variable capacitor 20 connected across the end of coil 18. The grid connection 21 of the tube 16 is wired to terminal 22 of a double-throw double-pole switch 23. It also is wired to one of the center terminals 24 of switch 23. Interposed in series with these connections is a grid resistor 25. The remaining center terminal of switch 23 is designated by the numeral 26. It is connected to a first meter terminal 27, the remaining meter terminal 28 being connected to the ground. It is to be understood that all of the ground connections shown in the diagram in FIG. 1 are common to the ground designated at 34. In parallel with meter 13 is a Zener diode 30 which conducts voltages which might otherwise damage the meter 13.

The impedance bridge circuit includes a variable resistance bridge shown at 31. One element in the bridge is a variable resistance 32. The remaining element in the bridge is the conductor whose impedance is being tested, which is connected at two terminals 33.

The impedance bridge also includes an exciter coil 35 in proximity with the oscillator coil 18. Coil 35 is inductively coupled to coil 18. A terminal 36 on switch 23 is used to connect bridge 31 to meter 13 by completing a circuit between terminals 36 and 26. At such time, the oscillator circuit is completed through a terminal 37 on the same side of the switch as terminal 36. The terminal 37 is connected to ground through a bias resistance 38 which matches the bias circuitry otherwise completed through the meter 13.

While the details of grid dip oscillator circuits and impedance bridges have been known for some time, the important characteristic of the structure disclosed herein is the integral coupling of the two circuits in a single test instrument. This is accomplished by housing the two circuits as a unit, shown in FIGS. 1 and 2. The test equipment itself is contained in a housing 40 mounted for carrying purposes in a case 41. The case 41 also includes a recess 42 for a power supply cord 43 having suitable end terminals for connection to the test instrument and to a conventional power supply. It also includes a hinged upper section 44 having a recess 45 within which the protruding portions of the test equipment fit when the section 44 is closed over the remainder of the casing 41. Mounted in a row of cylinder recesses 46 are a series of coil units 47, releasably held within casing section 44 by a simple tension spring 48 anchored at its respective ends.

The upper plate 50 of the housing 40 include most of all the connections for the test instrument, with the exception of the power connection 51 mounted on its back surface 52 and the coil connector 53 mounted on one end surface 54.

Mounted on the plate 50 is the dial of meter 13. This can be any conventional microammeter. There also is included a control knob 55 for the variable resistance 15, used as amplitude control for the apparatus. A control knob 56 for the variable capacitor 20 in the grid dip oscillator circuit is provided with a vernier dial 57 which describes an arc over a suitably calibrated scale 58 to designate the frequency to which the oscillator circuit is tuned. The knob 60 for the variable resistance 32 is provided with a projection 61 fixed to it which describes an arc about a scale 62 that designates impedance in ohms. The input terminals 33 can be any desired type of terminals for providing a readily usable connection between conducting wires (not shown) which are in turn connected to the respective ends of the conductor whose impedance is to be determined.

The units 47 include the coil elements shown in FIG. 1 and designated by the numerals 18 and 35. Each unit 47 must be wound properly for testing of frequencies within one of the respective frequency scales included in the scale 58. A typical coil unit 47 is shown in FIGS. 4 and 5. It is encased within a non-conductive cylindrical casing 61. The base 62 of the casing 61 supports five pins, 63 through 67, corresponding respectively to the connections designated by the numerals 63 through 67 in FIG. 1. The pins 63 through 67 match corresponding sockets 63' through 67' in the socket 53 at the casing end 54.

The typical coil arrangement shown in FIG. 5 includes an exciter coil 35 having one end connected to pin 67 and the remaining end thereof connected to pin 66. The coaxial oscillator coil 18 adjacent to coil 35 has one end connected to pin 65 and its remaining end connected to pin 63. The center tap of coil 18 is connected to pin 64.

By using a series of coil units 47 having identical base pins so as to match the sockets 53, one can readily interchange coil units 47 as required to match the frequency of the conductor being tested. This greatly increases the range of the instrument and eliminates the inaccuracy which would follow if more than one set of coils were mounted on the instrument at any given time. The following table describes the structure of a typical set of coils for a frequency range from 1.2 megacycles to 90 megacycles.

| Coil No. | Freq. M.C. | Diameter of coil | Turns | Wire size | Center tap from grid end of coil | Bridge exciter coil turns |
|---|---|---|---|---|---|---|
| 1 | 1.2–2.8 | ¾" | 140 | 32 | 107 | 9 |
| 2 | 2.7–6.4 | ¾" | 42 | 32 | 29 | 5 |
| 3 | 6.0–14.0 | ½" | 40 | 24 | 26 | 4¼ |
| 4 | 14.0–32.0 | ½" | 15 | 20 | 10 | 3¼ |
| 5 | 32.0–65.0 | ½" | 4 | 20 | 2¾ | 3 |
| 6 | 65.0–90.0 | This coil consists of a length of wire 3" long bent into a loop ⅜" wide x 1⁵⁄₁₆" long, center tapped 2³⁄₁₆" from grid end. Bridge exciter coil is 1¹⁵⁄₁₆" long. #20 wire bent into a ⁹⁄₁₆" loop. | | | | |

To check the frequency of a conducting element and its impedance at the operating frequency, one first places a coil unit 47 in socket 53, choosing a unit 47 encompassing the frequency range of the conductor, if known. If the frequency range is not known, one must select the proper coil unit 47 by trial and error, choosing the coil unit 47 which provides the maximum dip in the reading of meter 13. The knob 56 is then rotated slowly over the scale 58, and a very sharp "dip" will be noted on meter 13 as a nodal point is reached when the fundamental frequency of the object being tested is matched. Lesser dips will be noted when a harmonic of this fundamental frequency is matched. During the setting of the frequency reading, the switch 23 must be set so as to connect the terminals 22 and 26.

After the unit is set with the dial 57 on the frequency of the object as read on the scale 58, the switch 23 is reversed to connect terminals 26 and 36, as well as terminals 24 and 37. The grid dip oscillator is shunted to ground and will continue to function, providing an inductive coupling between the coil 18 and the bridge exciter coil 35. To utilize the impedance bridge, the object being tested is connected, across its respective ends, to the terminals 33. Suitable matched conductors having equal length should be used for this purpose. The knob 60 is then turned to the high end of the scale 62 and moved down this scale until a nodal point or dip is noted on meter 13 just prior to a sharp rise. At the low point, the needle 61 on the knob 60 will permit the user to read the measured impedance on scale 62. The impedance measured in this way will be the impedance of the object at the previously measured frequency.

The instrument has many applications. One particularly useful area is in matching the antenna of a radio transmitter to the frequency being transmitted or received thereby. For instance, the transceiver as commonly used in a mobile unit is mounted on a body which in itself is conductive, such as the chassis and body of an automobile. When installing such an antenna, it is desirable that the antenna itself be matched to the frequency of the transceiver signal, and that the impedance of the feed line from the antenna to the transceiver be matched to the impedance of the antenna. This can be accomplished by measuring the frequency of the antenna, using the grid dip oscillator circuit of the instrument. The antenna frequency can be changed by lengthening or shortening it. After the antenna frequency is achieved, and set on the scale 58, one can connect the terminals 33 to the ends of the antenna and measure its impedance at that frequency. One can then choose a feed line rated at the desired impedance. By matching the frequency of the antenna to the transceiver signal and the impedance of the antenna feed line to the impedance of the antenna at its operating frequency, one can greatly improve the reception and transmission of signals to such a unit. The test instrument described above makes such matching relatively simple, without requiring manipulation of several test instruments and related loose conductors.

In addition to the related functions of the test instrument circuits, one can use the grid dip oscillator circuit or the impedance bridge in any of their normal functions. As examples, the grid dip oscillator circuit can be used to transmit a steady continuous wave signal on any of the desired frequency ranges. It can be used to determine the frequency of any antenna, wire or conductive body within the range of the coil unit 47 inserted therein. It also can be used to check the frequency of a tank circuit or to check the harmonic radiation of other oscillators or transmitters. By leaving the setting of the amplitude knob 55 untouched, one can use the meter 13 to check the comparative field strength of two oscillators operating at the same frequency. The impedance bridge can also be used to determine whether an impedance load is a pure resistive load or is inductive. The versatility of the test instrument in checking both oscillating frequency and impedance and also in relating frequency to impedance has unlimited possibilities.

Many of the details of this structure can obviously be modified. One can utilize solid state circuits in place of the conventional tube circuitry illustrated. The power supply can obviously be modified to meet the power requirements of the particular instrument. In addition, the impedance bridge can be a capacitor controlled unit rather than a resistance control unit as shown. The primary feature of the system is the integral coupling of the grid dip oscillator and impedance bridge to interrelate their functions in a manner much more simple than has been previously available for testing purposes.

Having thus described my invention, I claim:

1. An instrument for determination of the resonant frequency and operating impedance of an electrical conductor, comprising:
   a variable frequency oscillator circuit having a wound coil wired to the input thereof;
   means in said oscillator circuit for tuning the operating frequency signal at the coil;
   a power supply operatively connected to the oscillator circuit;
   an impedance bridge having a wound exciter coil wired to the input thereof and inductively coupled to the wound coil of the oscillator circuit and including terminals for connection across the conductor being tested;
   manually operable impedance means in said impedance bridge to balance the bridge during use;
   indicator means capable of indicating relative potential; and
   switching means operatively selectively connecting the indicator means across the wound coil of the oscillator circuit or across the impedance bridge.

2. The apparatus as in claim 1 wherein said switching means operatively shunts the oscillator circuit to bypass said indicator means when the impedance circuit is coupled to said indicator means.

3. The apparatus as in claim 1 further comprising a housing of electrically non-conductive material and wherein the oscillator circuit coil and impedance bridge exciter coil are coaxially positioned within said housing as a structural unit, the oscillator circuit coil and impedance bridge coil having electrical terminals leading therefrom and releasably connected to complementary terminals in the respective circuits.

4. The apparatus as defined in claim 1 further comprising a housing of electrically non-conductive material and wherein the oscillator circuit coil and impedance bridge exciter coil are coaxially positioned within said housing;
   connector terminals mounted to the exterior of said housing, the leads from the coils being wired to said connector terminals;
   connector elements wired to the respective circuits; said connector elements being complementary to said connector terminals and being selectively coupled therewith.

5. The apparatus as in claim 1 wherein the manually operable means in said oscillator circuit includes a manually positioned dial movable as the circuit is tuned; and
   a calibrated scale associated with said dial to indicate measured frequency.

6. The apparatus as in claim 1 wherein the manually operable means in said impedance bridge includes a manually positioned dial movable as the bridge is balanced;
   and a calibrated scale associated with said dial to indicate measured impedance.

References Cited

UNITED STATES PATENTS

| 2,337,759 | 12/1943 | Loughlin | 324—57 |
| 2,461,286 | 2/1949 | Kline. | |
| 2,876,599 | 3/1959 | George. | |
| 3,164,993 | 1/1965 | Schmidt | 324—40 X |
| 3,252,086 | 5/1966 | Lundstrom | 324—61 |

OTHER REFERENCES

A New Bridge for Impedance Measurements in The General Radio Experimenter, General Radio Company, Cambridge, Mass., March 1949, vol. XXIII, No. 10, p. 1.

Yuenger, Warren R.: An Inexpensive Grid Dip Oscillator, in Radio and Television News, July 1950, p. 58.

EDWARD E. KUBASIEWICZ, Primary Examiner

J. M. HANLEY, Assistant Examiner

U.S. Cl. X.R.

324—59